US007015396B2

(12) United States Patent
Wada et al.

(10) Patent No.: US 7,015,396 B2
(45) Date of Patent: Mar. 21, 2006

(54) INSULATION MATERIAL FOR ELECTRICAL MACHINES

(75) Inventors: Yoshihiko Wada, Tokyo (JP); Masamichi Koide, Tokyo (JP); Akira Ogura, Tokyo (JP); Masaaki Eguchi, Tokyo (JP)

(73) Assignee: Nikkiso Co., Ltd., Tokyo (JP)

( * ) Notice: Subject to any disclaimer, the term of this patent is extended or adjusted under 35 U.S.C. 154(b) by 0 days.

(21) Appl. No.: 10/363,725

(22) PCT Filed: Sep. 25, 2002

(86) PCT No.: PCT/JP02/09877

§ 371 (c)(1),
(2), (4) Date: Mar. 6, 2003

(87) PCT Pub. No.: WO03/030334

PCT Pub. Date: Apr. 10, 2003

(65) Prior Publication Data

US 2005/0101695 A1    May 12, 2005

(30) Foreign Application Priority Data

Sep. 28, 2001   (JP)   ............................. 2001-299926
Sep. 28, 2001   (JP)   ............................. 2001-299944

(51) Int. Cl.
   *H01B 17/00*   (2006.01)

(52) U.S. Cl. .............................. 174/110 N; 174/110 E; 174/119 C; 174/122 C; 174/137 R; 174/110 PM

(58) Field of Classification Search ............ 174/110 N, 174/110 PM, 110 E, 119 C, 122 C, 137 R
   See application file for complete search history.

(56) References Cited

U.S. PATENT DOCUMENTS

| 3,710,437 | A | * | 1/1973 | Kipple et al. ................. 29/596 |
| 4,160,926 | A | * | 7/1979 | Cope et al. .................. 310/215 |
| 5,416,373 | A | * | 5/1995 | Maruyama et al. ......... 310/208 |
| 5,721,397 | A |   | 2/1998 | Weinbert |
| 5,982,056 | A | * | 11/1999 | Koyama et al. .............. 310/43 |
| 6,359,232 | B1 |  | 3/2002 | Markovitz et al. |
| 6,627,561 | B1 |  | 9/2003 | Wulliman et al. |

OTHER PUBLICATIONS

"Glossary of Geologic Terms" prepared by Dick Gibson, Jan. 15, 2002.*
International Standard for "Specification for Insulating Materials Based on Mica", CEI IEC 60371-1, Second Ed., Jan. 1980. With translation.
Japanese Industrial Standard, "General Rules for Electrical Insulating Mica Products", JIS C 2250: 2002., With translation.
Japanese Standards Association: Japanese Industrial Standard, *"How-To Series: Electrical Insulation Material Selection Points,"* pp. 62-67 (May 30, 1987), With Translation.

* cited by examiner

*Primary Examiner*—Dean A. Reichard
*Assistant Examiner*—Jinhee Lee
(74) *Attorney, Agent, or Firm*—Darby & Darby

(57) ABSTRACT

The present invention improves the heat resistance and strength of insulation material inserted between a core and a coil of an electrical machine. A slot liner is placed between a core of an electric motor of an electric machine and a conductor of a coil. The slot liner has a multi-layer construction with an aggregate mica insulation sheet, which has excellent mechanical strength, and a peeled mica insulation sheet, which has excellent voltage resistance at high temperatures. The slot liner can include a main insulation sheet and a reinforcement sheet. The reinforcement sheet is placed between the main insulation sheet and the core at the ends of the slot.

19 Claims, 3 Drawing Sheets

INSULATION MATERIAL FOR ELECTRICAL MACHINES

This is a U.S. national phase application under 35 U.S.C. §371 of International Patent Application No. PCT/JP02/09877 filed Sep. 25, 2002, and claims benefit of Japanese Patent Application No. 2001-299944 filed Sep. 28, 2001; Japanese Patent Application No. 2001-299926 filed Sep. 28, 2001. The International Application was published in Japanese on Apr. 10, 2003 as WO 03/030334 A1 under PCT Article 21(2).

FIELD OF THE INVENTION

The present invention relates to insulation material used in coils of electrical machines. Insulation material can be formed as a slot liner which is placed in slots in a core of an electrical machine. The slot liner provides insulation between the core and the conductor coil.

BACKGROUND OF THE INVENTION

The present invention provides insulation material for ensuring insulation between the core and the conductor coil of an electrical machine. A rotary electrical machine, such as an electrical motor, an electrical generator, or the like, has a core with a plurality of teeth. The conductor coil is placed in slots located between the teeth in the core. A slot liner is a sheet of insulation material placed between the core and the conductor coil. The slot liner provides electrical insulation between the core and the conductor coil.

Insulation material in rotary electrical machines used in high temperature-environments must provide adequate heat resistance. Mica is typically used in this type of insulation material. Mica insulation material has pieces of aggregate mica or peeled mica which are attached together. Aggregate mica is mica formed in fine flakes which are hardened with resin. Peeled mica is mica formed in thin pieces that are peeled from a mica stone.

The heat resistance of the resin which binds the small pieces of mica in aggregate mica insulation may be inadequate. Furthermore, aggregate mica insulation is brittle, and therefore, holes may form in the insulation material during manufacturing or by vibrations and the like that occur while using rotary electrical machines. These holes can damage the insulation material. Additionally, peeled mica insulation is not flexible and may break as it is placed inside the slots, thereby damaging the insulation material. Peeled mica insulation is also expensive.

Sheets of mica insulation material are typically not pliant. When forming the portion of the conductor coil that protrudes from the end of the core, the insulation material supports a load that may break the insulation material. To minimize the risk of breaking the mica insulation material, a conventional slot liner can be constructed by layering the mica insulation material with a layer of reinforcement material, such as resin, having relatively good mechanical strength.

The layer of reinforcement resin in the conventional slot liner described above is interposed between the conductor coil and the core. However, the resin may expand or deform due to high temperatures, which can result in the separation of the reinforcement layer from the core. The separation of the reinforcement layer from the core prevents the transfer of heat generated from the conductor coil, thereby weakening the ability of the conductor coil to transfer heat to the core.

OBJECT AND SUMMARY OF THE INVENTION

The present invention improves the heat resistance and strength of insulation material in the conductor coil of an electrical machine. Additionally, the present invention ensures the strength of a slot liner of a rotary electrical machine, prevents damage to the insulation material, and improves heat transfer in the conductor coil.

The insulation material is placed between a core and a conductor coil of an electrical machine. The insulation material is formed by layering at least one sheet of peeled mica insulation which has peeled mica as the base material and at least one sheet of aggregate mica insulation which has aggregate mica as the base material. The sheets of peeled mica insulation and aggregate mica insulation have good insulation properties.

A slot liner can be placed inside the slots in the core of a rotary electrical machine. The slot liner is formed from insulation material and is a layer of insulation between a conductor coil placed in the slots and the core. The slot liner is formed by layering at least one sheet of peeled mica insulation which has peeled mica as the base material and at least one sheet of aggregate mica insulation which has aggregate mica as the base material.

The insulation material can also comprise a sheet of peeled mica insulation interposed between two sheets of aggregate mica insulation.

Separate reinforcement sheets can be placed at either end of the slot liner. The reinforcement sheets are placed near the ends of the main insulation sheet in the slot. The main insulation sheet in the slot extends in the axial direction of the rotary electrical machine to provide insulation between the conductor coil and the core. Insulation is maintained between the conductor coil and the core since the reinforcement sheet receives a portion of the load, which would otherwise be carried solely by the main insulation sheet, when forming the ends of the conductor coil and the like. Additionally, the reinforcement sheet is only located at the ends of the slot liner. Therefore, the reduction of heat transfer from the conductor coil to the core due to peeling of the reinforcement sheet can be prevented.

The material of the reinforcement sheet is determined based on the environmental conditions of the rotary electrical machine, particularly the temperature. For instance, the insulating ability of resin is reduced in the presence of carbonization resulting from high temperatures. Therefore, it is necessary to select material for the reinforcement sheet that is suited to the temperature conditions.

The above, and other objects, features, and advantages of the present invention will become apparent from the following description read in conjunction with the accompanying drawings, in which like reference numerals designate the same elements.

DESCRIPTION OF THE PREFERRED EMBODIMENTS

Figure 1:
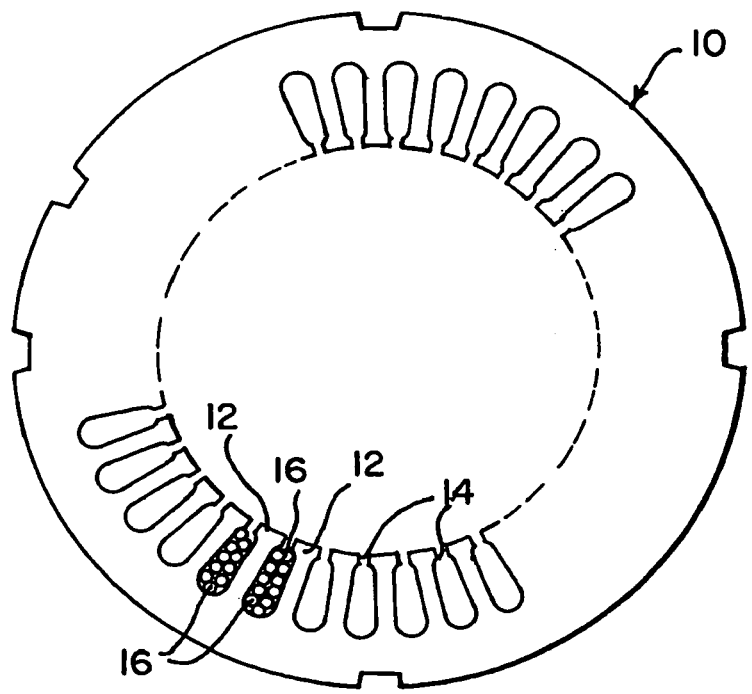
FIG. 1 shows the construction of a stator of an electric motor which is an example of an electrical machine according to the present invention.

A stator of a rotary electrical machine, such as a generator, an electric motor, or the like, is shown in FIG. 1. The stator includes an approximately cylindrical core 10. The surface at the inner perimeter of the core 10 faces the rotor and has teeth 12 which are arranged at a predetermined spacing in the circumferential direction. A slot 14 is the space between the teeth 12. Conductors 16 form a coil and are stored inside the slot 14.

Figure 2:
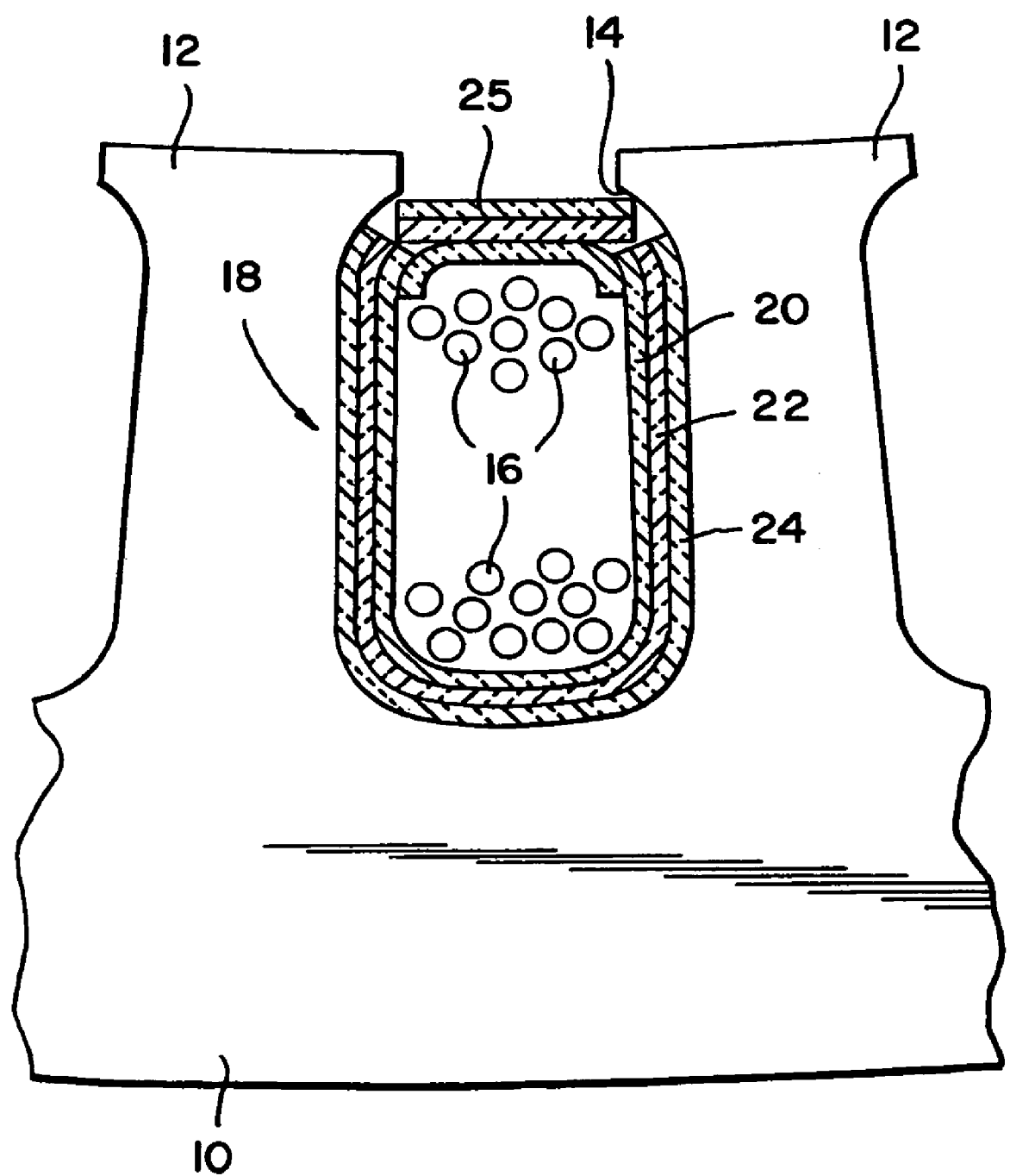
FIG. 2 shows a slot liner inside a slot according to the present invention.

A slot liner 18 is formed from insulation material placed along the inner perimeter of the slot 14 as shown in FIG. 2. The slot liner 18 is located between the conductors 16 in the coil and the core 10. The slot liner 18 is constructed with three layers: an inner layer 20 which is the innermost layer, a middle layer 22, and an outer layer 24. The inner layer 20 and the outer layer 24 are aggregate mica insulation sheets with aggregate mica as the base material. The middle layer 22 is a peeled mica insulation sheet with peeled mica as the base material. The thickness of the slot liner 18 in FIG. 2 is larger than the actual thickness of the slot liner 18 in order to show the construction clearly. A wedge 25 is placed in the opening of the slot 14.

Figure 3:
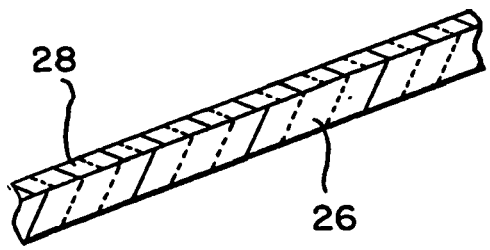
FIG. 3 is a cross-sectional view of a slot liner comprising insulation material according to an embodiment of the present invention.
Figure 4:
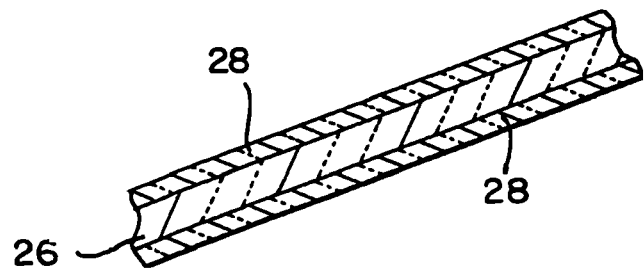
FIG. 4 is a cross-sectional view of a slot liner comprising insulation material according to an embodiment of the present invention.

The aggregate mica insulation sheet is formed by layering a base material sheet 26 and a glass cloth sheet 28 as shown in FIGS. 3 and 4. The base material sheet 26 has flakes of mica, which are bound and hardened with a resin. The glass cloth sheet 28 is woven from glass fibers. Additionally, the base material sheet 26 containing aggregate mica can be interposed between two glass cloth sheets to form the aggregate mica insulation sheet as shown in FIG. 4.

The middle layer 22, which is interposed between the inner layer 20 and the outer layer 24, is comprised of a peeled mica insulation sheet with peeled mica as the base material. The peeled mica insulation sheet can also be constructed with two or three layers having a base material sheet 26 made of peeled mica and a glass cloth sheet 28 as shown in FIGS. 3 and 4.

The aggregate mica insulation sheet is flexible and is easy to manage. However, the voltage resistance value of the aggregate mica insulation sheet is relatively low. The peeled mica insulation sheet has a high voltage resistance value, but breaks easily when bent. Additionally, peeled mica insulation sheets are expensive.

The peeled mica insulation sheet of the present invention can be interposed between two aggregate mica insulation sheets. The slot liner having a three-layer construction is easy to manage, which is particularly advantageous when the slot liner is inserted into the slot. The aggregate mica insulation sheets have a relatively high mechanical strength and support the brittle peeled mica insulation sheet when the peeled mica insulation sheet is interposed between the aggregate mica insulation sheets. The three-layer construction prevents the formation of stress concentrations and prevents breakage when bending the insulation sheets. Furthermore, the cost is lower when using two aggregate mica insulation sheets rather than using three peeled mica insulation sheets.

The insulation material and the slot liner constructed as described above both have favorable qualities common to peeled mica insulation sheets and aggregate mica insulation sheets. Additionally, the aggregate mica insulation sheet can be impregnated with varnish to improve the insulating ability of the insulation material.

Figure 5:
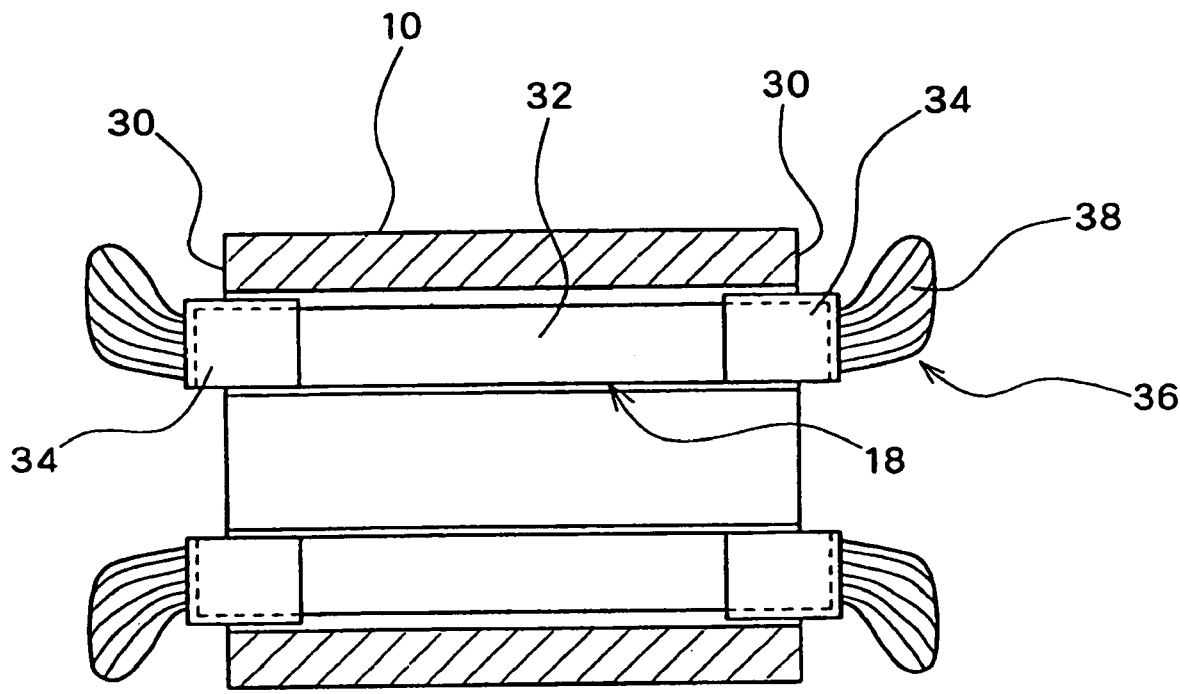
FIG. 5 is a cross-sectional view of a shaft of a stator core according to an embodiment of the present invention.

FIG. 5 shows a cross-section of the stator of the electrical machine taken from an orthogonal direction to the axis of the stator. The slot liner 18 extends in the axial direction of the stator, and the slot liner 18 is longer than the core 10. Both ends of the slot liner 18 protrude from the end surfaces 30 of the core 10. The slot liner 18 includes a main insulation sheet 32 having the three-layer construction as shown in FIG. 2 and a reinforcement sheet 34. The main insulation sheet 32 extends over the entire length, and the reinforcement sheet 34 is placed only at the two ends of the core 10. As shown in FIG. 5, the single reinforcement sheet 34 is placed on the outside of main insulation sheet 32 at the end surfaces 30 of the core 10 and extending outward to the right and left of the end surfaces 30 of the core 10. The reinforcement sheet 34 is interposed between the main insulation sheet 32 and the core 10.

A conductor coil 36 is housed in the core 10 and includes coil ends 38, which protrude from the end surfaces 30 of the core 10. The coil ends 38 are molded so that they bend outwards in the radial direction of the rotary electrical machine as shown in FIG. 5. When molding the coil ends 38, the portion of the slot liner 18 that protrudes from the end surface 30 of the core 10 is pushed, thereby generating a bending load on the slot liner 18. A large stress is generated at the corner portion of the slot liner 18 located at the end surface 30 of the core 10. The reinforcement sheet 34 disperses the stress generated at the corner portion of the slot liner 18. Thus, the stress generated on the main insulation sheet 32 is lowered. Damage to the main insulation sheet 32 due to the mechanical weakness of the mica is prevented, and insulation is maintained between the conductor coil and the core.

The reinforcement sheet 34 is made of a polyimide resin. The heat resistance of polyimide resin is extremely high. For example, Kapton (registered trademark) of DuPont has a heat resistance of around 400° C. With such a high heat resistance, the reinforcement sheet 34 does not carbonize at high temperatures, and insulation is maintained between the conductor coil and the core.

The reinforcement sheet 34 shown in FIG. 5 is not present in any other part of the slot liner 18 except at the ends. Therefore, the heat generated by the current flow through the coil wire is transferred to the core 10 without going through the reinforcement sheet 34. In other words, the reinforcement sheet 34 does not inhibit heat transfer at the center portion of the core 10 where a high heat transfer rate can be achieved. In addition, although polyimide resin does not carbonize at 400° C., the polyimide resin shrinks at temperatures higher than 400° C. When the area of adhesion between the core 10 and the reinforcement sheet 34 is reduced because of the shrinkage of the polyimide resin, heat transfer is inhibited. Therefore, the reinforcement sheet 34 is placed only at the ends of the slot liner 18. Even if the reinforcement sheet 34 shrinks, heat transfer at the center portion of the core 10 is not inhibited because the reinforcement sheet 34 is only present at the ends of the slot liner 18. Therefore, sufficient heat transfer is maintained.

Figure 6:
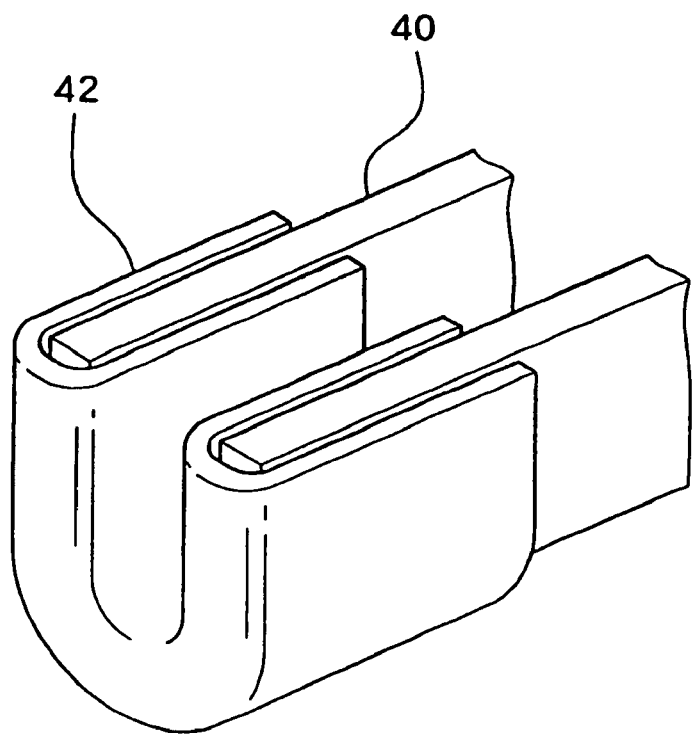
FIG. 6 is a perspective view of a reinforcement sheet according to an embodiment of the present invention.

FIG. 6 shows the end portions of the slot liner according to another embodiment of the present invention. A main insulation sheet 40 has the same construction as the main insulation sheet previously described as slot liner 18. A reinforcement sheet 42 is placed at the end portions of the main insulation sheet 40, i.e., near the end surfaces of the core. The reinforcement sheet 42 is folded, and the fold crease of the reinforcement sheet 42 is positioned along the end of the main insulation sheet 40. Therefore, the reinforcement sheet 42 covers the end of the main insulation sheet 40. The end portion of the main insulation sheet 40 is reinforced even more than the embodiment shown in FIG. 5.

The slot liner is suited particularly for high temperature environments such as the interior of a stator of an electric motor of a canned motor pump which handles high temperature fluids. However, the slot liner can also be used in other electrical machines with conductor coils.

The embodiment of the present invention described above is a slot liner having layers of two types of mica insulation sheets and also having a reinforcement sheet positioned only near the ends of the slot liner. However, another embodiment of the present invention can be constructed either to have layers of two types of mica insulation sheets or to have a reinforcement sheet only near the ends of the slot liner. Thus, these characteristics of the slot liner can be implemented separately.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

The invention claimed is:

1. Insulation material comprising:
   at least one first sheet consisting of peeled mica formed of thin pieces peeled from a mica stone and glass cloth sheet; and
   at least one second sheet comprising aggregate mica in contact with said at least one first sheet, wherein the aggregate mica comprises flakes of mica that are resin bonded.

2. Insulation material as described in claim 1, wherein said at least one first sheet is interposed between two of said at least one second sheet.

3. An electric device comprising:
   a core;
   a coil; and
   an insulation material between said core and said coil, said insulation material comprising:
      at least one first sheet consisting of peeled mica formed of thin pieces peeled from a mica stone and glass cloth sheet; and
      at least one second sheet comprising aggregate mica in contact with said at least one first sheet, wherein the aggregate mica comprises flakes of mica that are resin bonded.

4. An electric device as described in claim 3, wherein the insulation material extends in an axial direction of said electric device and has a length equal to or greater than a length of said core.

5. An electric device as described in claim 3, wherein:
   the at least one second sheet consists of an inner layer comprising the aggregate mica and an outer layer comprising the aggregate mica; and
   the at least one first sheet consists of a middle layer disposed between said inner layer and said outer layer, the middle layer comprising the peeled mica.

6. A rotary electric device comprising:
   a core having a slot and end surfaces;
   a conductor coil in said slot; and
   an insulation material comprising:
      a main insulation sheet extending in an axial direction of said rotary electric device, said main insulation sheet having a length equal to or greater than a length of said core; and
      a reinforcement sheet at each end of said core, said reinforcement sheet on top of an end portion of said main insulation sheet near the end surfaces of said core, a portion of said reinforcement sheet is between said core and said main insulation sheet and capable of reinforcing against a load that is applied to said main insulation sheet.

7. A rotary electric device as described in claim 6, wherein said reinforcement sheet comprises a polyimide.

8. A rotary electric device as described in claim 6, wherein said reinforcement sheet has a heat resistance of 400° C. or greater.

9. A rotary electric device as described in claim 6, wherein:
   said reinforcement sheet is folded along a crease, wherein said fold crease corresponds to said end portion of said main insulation sheet and covers said end portion.

10. A rotary electric device as described in claim 6, wherein said main insulation sheet comprises:
    at least one first sheet comprising peeled mica and
    at least one second sheet comprising aggregate mica in contact with said at least one first sheet.

11. A rotary electric device as described in claim 10, wherein said at least one first sheet is interposed between two of said at least one second sheet.

12. The rotary electric device of claim 6, wherein said coil has a length greater than the length of said main insulation sheet said a length of said reinforcement sheet.

13. An insulation liner comprising:
    an inner layer comprising aggregate mica;
    an outer layer comprising aggregate mica; and
    a middle layer disposed between said inner layer and said outer layer, consisting of peeled mica formed of thin pieces peeled from a mica stone and glass cloth sheet, wherein the aggregate mica of the inner and outer layers comprises flakes of mica that are resin bonded.

14. An electric device comprising:
    a core;
    a coil; and
    an insulation material between said core and said coil, said insulation material comprising:
       at least one first sheet consisting of peeled mica formed of thin pieces that are peeled from a mica stone and glass cloth sheet, and
       at least one second sheet comprising aggregate mica in contact with said at least one first sheet, wherein the aggregate mica comprises flakes of mica that are resin bonded,
    wherein the insulation material extends in an axial direction of said electric device and has a length equal to or greater than a length of said core.

15. An electric device as described in claim 14, wherein:
    the at least one second sheet consists of an inner layer comprising the aggregate mica and an outer layer comprising the aggregate mica; and
    the at least one first sheet consists of a middle layer disposed between said inner layer and said outer layer, the middle layer comprising the peeled mica.

16. A rotary electric device comprising:
    a core having a slot;
    a conductor coil in said slot; and
    an insulation material between said core and said conductor coil, said insulation material comprising:

at least one first sheet consisting of peeled mica formed of thin pieces peeled from a mica stone and glass cloth sheet; and at least one second sheet comprising aggregate mica in contact with said at least one first sheet, the aggregate mica comprising flakes of mica that are resin bonded.

17. A rotary electric device as described in claim 16, wherein said at least one first sheet is interposed between two of said at least one second sheet.

18. A rotary electric device as described in claim 16, wherein the insulation material extends in an axial direction of said rotary electric device and has a length equal to or greater than a length of said core.

19. A rotary electric device as described in claim 16, wherein:

the at least one second sheet consists of an inner layer comprising the aggregate mica and an outer layer comprising the aggregate mica; and the at least one first sheet consists of a middle layer disposed between said inner layer and said outer layer, the middle layer comprising the peeled mica.

* * * * *

UNITED STATES PATENT AND TRADEMARK OFFICE
CERTIFICATE OF CORRECTION

PATENT NO. : 7,015,396 B2  
DATED : March 21, 2006  
INVENTOR(S) : Yoshihiko Wada et al.

It is certified that error appears in the above-identified patent and that said Letters Patent is hereby corrected as shown below:

<u>Title page,</u>  
Item [54], Title, delete "INSULATION MATERIAL FOR ELECTRICAL MACHINES" and substitute -- INSULATING MATERIAL FOR ELECTRIC DEVICE COIL AND SLOT LINER OF ROTATING ELECTRIC MACHINE --.

Signed and Sealed this

Sixth Day of June, 2006

JON W. DUDAS  
*Director of the United States Patent and Trademark Office*